Figure 1:
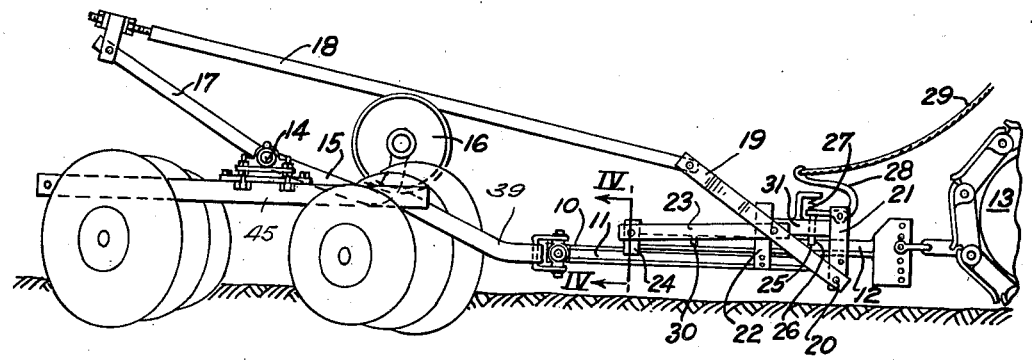

June 16, 1942.    K. D. PRIESTLEY    2,286,305
IRRIGATION RIDGER
Filed Oct. 18, 1941    2 Sheets-Sheet 1

INVENTOR.
Kenneth D. Priestley
BY Wm H. Atkinson
ATTORNEY.

June 16, 1942.   K. D. PRIESTLEY   2,286,305
IRRIGATION RIDGER
Filed Oct. 18, 1941   2 Sheets-Sheet 2

INVENTOR.
Kenneth D. Priestley
BY
ATTORNEY

Patented June 16, 1942

2,286,305

UNITED STATES PATENT OFFICE 2,286,305

IRRIGATION RIDGER

Kenneth D. Priestley, San Jose, Calif.

Application October 18, 1941, Serial No. 415,591

10 Claims. (Cl. 97—56)

My present invention relates to earth working agricultural implements, and more particularly to a disc-type of implement for use in forming ridges or levees to control the flow of water for irrigation purposes.

An object of the invention is to provide a simple, inexpensive and practical earth working implement for forming ridges, dykes or levees upon the surface of the ground.

Another object of the invention is to provide an earth working implement in which oppositely arranged gangs of earth engaging discs are supported upon independent and spaced frames that are adjustable with respect to each other in both pitch and gather.

Another object of the invention is to provide a novel lifting means for a multiple disc earth working implement in which means operated by the towing device will produce a substantially vertical lift of the earth engaging discs.

Another object of the invention is to provide a towing means for earth working implements having oppositely disposed gangs of earth working discs in which the individual gangs of earth working discs are free to follow the contour of the earth independently of each other.

Another object of the invention is to provide an earth working implement of the opposed disc type in which lateral spacing of earth working discs may be adjusted to vary the earth gathering characteristics thereof.

Another object of the invention is to provide an earth working implement of the ridge forming type having opposed gangs of leading and trailing earth engaging discs in which the lateral spacing and/or the working angle and pitch of the opposed gangs of discs may be adjusted to vary the earth gathering characteristics thereof.

Other objects and advantages of the invention will be in part evident to those skilled in the art and in part pointed out hereinafter in connection with the accompanying drawings, wherein there is shown by way of illustration and not of limitation a preferred embodiment and details of the invention.

Figure 2:
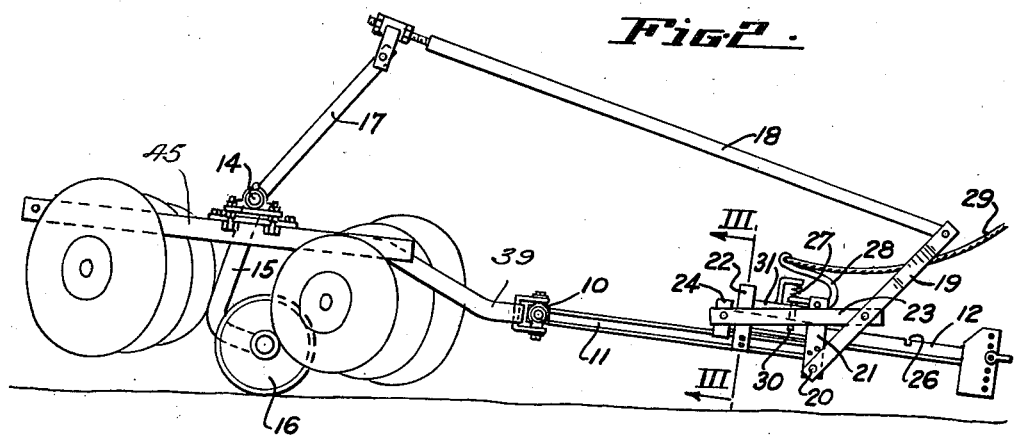
Figure 5:
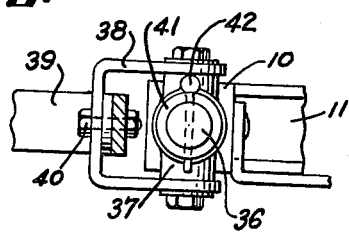
Figures 3, 4:
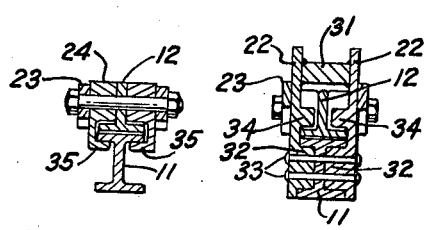
Figure 6:
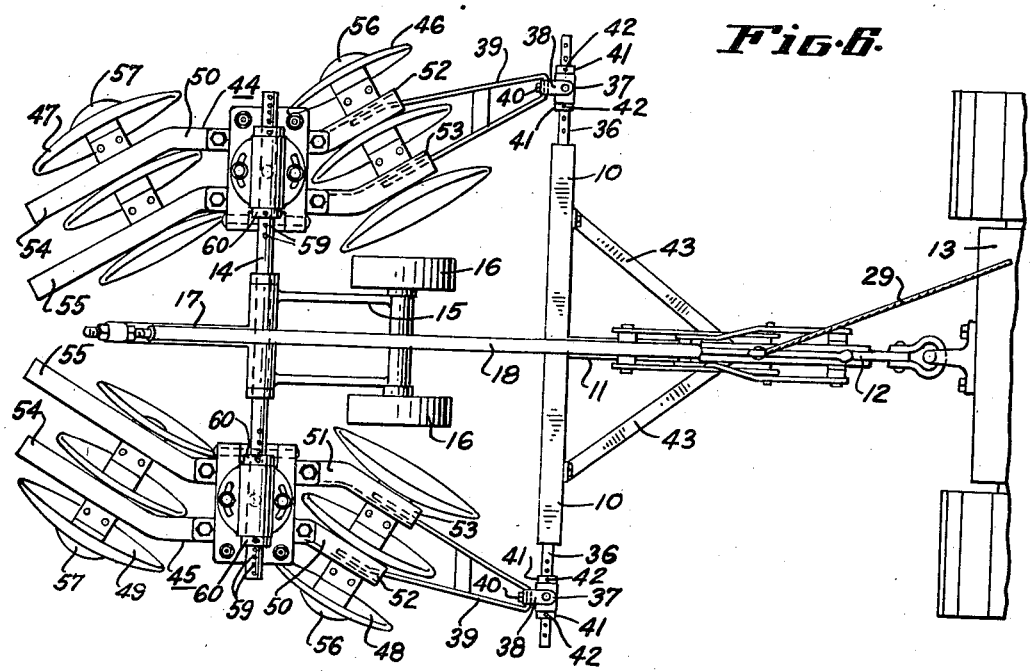
Figure 7:
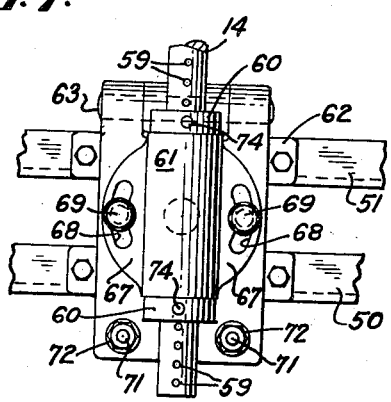
Figure 8:
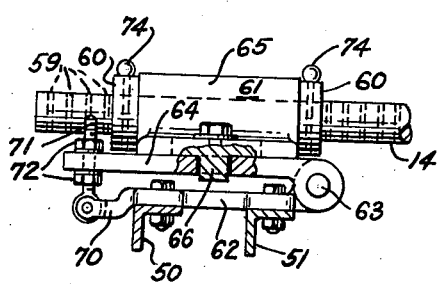
Figure 9:
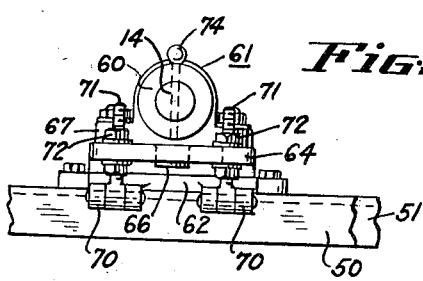

In the drawings:

Figure 1 is a side elevation of an earth working implement constructed in accordance with the invention in its earth working position, Figure 2 is a view similar to Figure 1 showing the earth working implement in its raised inoperative position, Figure 3 is a sectional view taken along line III—III of Figure 2 looking in direction of arrows, Figure 4 is a sectional view taken along line IV—IV of Figure 1 looking in direction of arrows, Figure 5 is a fragmentary enlarged view showing a detail of the arrangement illustrated in Figure 1, Figure 6 is a plan view of the device as illustrated in Figure 1 of the drawings, and Figures 7, 8 and 9 are respectively a plan, front and side of a further detail of construction.

For the purpose of describing the invention, reference will first be made to Figures 1 to 5 inclusive of the drawings for a brief description of the improved earth working implement, and a more detailed description of the lifting or ground disengaging mechanism associated therewith, after which will follow a more detailed description of the novel features of construction embodied in the earth working implement per se.

As shown in Figures 1 and 2, the earth working implement, as will appear hereinafter, is adapted to be drawn by a transversely extending tow beam 10 that has a centrally disposed and forwardly extending tongue 11 which is adapted to be connected through a relatively movable drawbar 12 to a tractor or other towing means 13. This earth working implement comprises two laterally spaced disc-carrying frames that are independently attached to the tow beam 10, and extending between these disc-carrying frames there is a lateral shaft 14 which is journaled upon these frames and serves to hold them in properly spaced relation to each other. Journaled upon this shaft 14 there is also a pivotally mounted chassis 15 which carries a pair of radially spaced ground engaging wheels 16 that are adapted, when moved into engagement with the ground, to raise and carry the disc-carrying frames in an elevated position. Extending oppositely from the chassis 15 there is an operating lever 17 which is shown as connected through a tie-rod 18 to a lever 19 that is pivoted at a point 20 upon a support 21 at the outer end of the forwardly extending tongue 11. This support 21 also serves as a guide for the drawbar 12 which is movable therethrough. Disposed rearwardly of the support 21 there is also a second guide 22 through which the drawbar 12 also moves. Engaging the lever 19 intermediate its pivotal point 20 at the outer end thereof, there are links 23 which are pivoted upon a slidable guide 24 carried by the movable drawbar 12. As illustrated in Figure 1, the drawbar 12 is held in its retracted position by means of a pin 25 that engages a notch 26 in the drawbar 12. The pin 25 is adapted to be raised against the action of a compression spring 27 by means of a lever 28 which is controlled by a pull-cord 29 which extends forwardly to a position where the operator of the tractor may conveniently reach same. In addition to the notch 26 carried by the drawbar 12, there is a second notch 30 which, as illustrated in Figure 2 of the drawings, is also adapted to be engaged by the pin 25 when the drawbar 12 has been extended. As here shown, the drawbar engaging pin 25 and the spring 27 are carried by a frame 31 that extends between the supports 21 and 22 which are secured upon the tongue 11.

As is more clearly shown in Figures 3 and 4 of the drawings, the forwardly extending tongue 11 is in the form of a vertically disposed I-beam, and the drawbar 12 is of inverted-T cross-section. As is clearly shown in Figure 3, the support 22 comprises a pair of oppositely disposed upwardly extending plates which are provided with bosses 32 that extend to the web of the tongue 11 where they are secured by rivets or other means 33. The support 21 also carries additional oppositely disposed bosses 34 under which the flanges of the drawbar 12 are adapted to slide, and at its outer end it carries the pin and spring supporting frame 31. As shown in Figure 4 of the drawings, the rearward end of the drawbar 12 is slidably secured upon the forwardly extending tongue 11 by means of underhanging flanges 35 that are carried by the drawbar guide 24. At this point it may be added that the support 21, except for its pivotal point 20 and the support for the lever 28, is substantially identical to the support 22.

With the above arrangement it will be readily seen that when the drawbar 12 is released, it will be free to slide either forward or backward along the tongue 11 until the pin 25 engages one or the other of the notches 26 and 30 formed therein. As this occurs, it will also be seen that this movement of the drawbar 12 will be transmitted through the links 23 to the lever 19 and the tie-rod 18 to the operating lever 17 of the chassis 15 and thus the wheels 16 carried thereby will be moved into or out of engagement with the ground, depending upon which direction the drawbar 12 is moved along the tongue 11.

In Figures 5 and 6 of the drawings, the tow beam 10 is shown as of solid construction and at its ends it has oppositely extending cylindrical or shaft-like portions 36 upon which there are adjustably positioned swivel-like members 37 that carry pivotally secured yokes 38 to which traction members 39 extending from each of the disc carrying frames are also pivotally attached, as by means of bolts 40. The swivel-like members 37 are shown as held in their adjusted positions upon the portions 36 of the tow beam 10 by means of collars 41 through which pins 42 extend.

Reference is now made to the remaining figures of the drawings for a more detailed description of the earth working implement per se. As will be seen from Figure 6, the tow beam 10 is of considerable length and is braced with respect to the tongue 11 by diagonal struts 43. This provides widely spaced points of attachment for the traction members 39, one of which is here shown as carried by a disc supporting frame 44, and the other of which is carried by a disc supporting frame 45. These traction members 39 are shown in the drawings as formed of strap iron and provide a bifurcated member the trailing ends of which are attached to the spaced angularly bent discs supporting frame members 44 and 45 and their leading ends are bent down to provide for an attachment to the towbar 10 at a point substantially in horizontal alignment with the centers of the earth working discs. The frame 44 carries a forward gang of three earth engaging discs 46 and a rear gang of similar earth engaging discs 47. Similarly, the frame 45 carries a forward gang of earth engaging discs 48 and a rear gang of earth working discs 49. These disc supporting frames 44 and 45 are here illustrated as comprising longitudinally extending substantially similar angle iron members 50 and 51 which have forward outwardly bent ends 52 and 53 and inwardly bent trailing ends 54 and 55. The forwardly extending ends 52 and 53 and the inwardly bent trailing ends 54 and 55 of the disc supporting frames 44 and 45 extend parallel to each other and support diagonally disposed shafts 56 and 57 upon which the earth working discs 46, 47, 48 and 49 are rotatably mounted, as is well understood in the art. With the ends of the angle iron members 50 and 51 of the disc supporting frames 44 and 45 bent in the manner above described, it will be seen that the forward and railing gangs of discs carried thereby will travel in different longitudinal lines and thus they will cover a greater surface of the ground and gather a sufficient amount of earth to provide a ridge without extending to an excessive depth in the earth. At this point it should also be noted that in each group of earth working discs 46, 47, 48 and 49 the discs are of progressively differing diameters. In the preferred arrangement as illustrated in the drawings the leading discs 46 and 48 are of a progressively smaller diameter starting from the longitudinal center line of the implement and the trailing earth working discs 47 and 49 are of progressively larger diameter starting from the longitudinal center line of the implement. This eliminates the likelihood of damage to the feeder roots of adjacent trees and reduces the amount of power required to operate the implement, as the trailing gangs of discs will operate principally to pile up earth that has been loosened by the leading gangs of discs. It will be noted that the traction members 39 extend outwardly from the disc supporting frames 44 and 45 where they are adjustably attached to the extending cylindrical ends 36 of the tow beam 10. This adjustability along the extending cylindrical ends 36 of the tow beam 10 is accomplished by providing a plurality of spaced holes 58 along the tow beam through which the pins 42 may be extended to secure the collars 41 and the swivel-like members 37 in any desired position therealong. At the same time, it will be noted that the lateral shaft 14 is also provided with spaced holes 59 through which pins may pass to secure collars 60 at various spaced positions therealong. One of these collars 60 is arranged upon the lateral shaft 14 at each side of a pivotal and hingable bearing forming means 61 that also provides a journaled connection between each of the disc supporting frames 44 and 45 and the lateral shaft 14. The spacing of these pivotal and hingable bearing forming means 61 upon the lateral shaft 14 will be determined by the type of ridge desired and by the nature of the ground to be worked. Where a relatively low ridge is required, the disc supporting frames 44 and 45 will set nearer together than where a higher ridge is desired. At the same time, to provide for a sufficient gathering spread of the earth working discs, these pivotal and hingable bearing forming means 61 are adjustable to change the relative angular positions of the disc supporting frames 44 and 45 with respect to the lateral shaft 14. When this angular adjustment is made, it will be understood that the attachment of the traction members 39 to the tow beam 10 will be adjusted to accommodate this change. At this point it should be noted that irrespective of their angular adjustment or spacing, the disc supporting frames 44 and 45 will be free to rock or pivot in a vertical plane about the shaft 14 so that the leading and trailing gangs of earth working discs may follow the contour of the earth over which they pass. In addition to the above journaled and pivotal connection, these pivotal and hingable bearing forming means 61 are also adapted to provide an additional adjustment that will permit a changing of the earth working angle of the gangs of earth working discs. This adjustment is obtained by tilting the disc supporting frames 44 and 45 sidewise with respect to the axis of the lateral shaft 14.

While the pivotal and hingable bearing forming means 61 may take many forms, they are each shown in Figures 7, 8 and 9 as comprising a base plate 62 to which the frame forming angle irons 50 and 51 are secured in longitudinally extending and laterally spaced relation. Hingedly attached to the base plate 62 by means of a longitudinally extending hinge forming pintle 63 there is a supporting plate 64 upon which there is adjustably mounted a sleeve 65 in which the lateral shaft 14 is journaled upon the bearing forming means 61. This sleeve 65 has a downwardly extending pivot forming portion 66 that extends into a central opening formed in the supporting plate 64, as is clearly shown in section in Figure 8 of the drawings. The sleeve 65 has side flanges 67 in which there are formed arcuate slots 68 through which bolts 69 extend to secure the axis of the sleeve 65 and the lateral shaft 14 in any desired angular relation with respect to the disc supporting frames 44 and 45. Cooperating with the pintle 63, the base plate 62 also has outwardly extending portions 70 at its opposite edge which carry threaded studs 71. These threaded studs 71 are shown as having adjustable nuts 72 by means of which the hinging position of the sleeve 65 upon the frames 44 and 45, or in other words, the pitch of the earth working discs, may be determined. From these latter figures of the drawings, it will be seen that the pivotal and hingable bearing forming means 61 are spaced with respect to each other upon the lateral shaft 14 by the spacing collars 60 which are held by pins 74 that are here shown as passing through the holes 59 previously described as positioned along the shaft 14.

It is believed that the operation of this invention will be clearly understood from the above description. However, it may be added that, by the provision of the chassis 15 with its ground engaging wheels 16 and the operating mechanism, as described, there is provided means which will facilitate the making of all of the above adjustments of the disc supporting frames 44 and 45 while in the field. In other words, if any of the above adjustments are required, it is only necessary to release the drawbar 12 to thus bring the wheels 16 upon the chassis 15 into engagement with the earth, after which a slight additional forward movement of the tractor 13 will cause the frames 44 and 45 with their earth engaging discs 46, 47, 48 and 49 to be raised substantially vertically and out of contact with the earth, after which the frames 44 and 45 may be easily and conveniently adjusted to any desired new angular position or pitch upon the lateral shaft 14. After this has been accomplished, it will only be necessary to back the tractor 13 a corresponding distance to reset the drawbar 12. This will lower the implement and place the earth working discs 46, 47, 48 and 49 at substantially the points from which they were originally raised, and the ridge forming operations can then proceed without leaving any gap or interruption therein.

Among some of the other advantages of the invention is the fact that it provides a compact unit which is capable of forming a complete ridge of uniform contour in a continuous and single operation and, because of the close coupling of the gangs of earth working discs, it provides an implement of extreme flexibility which can be easily operated in close quarters and on sharp-angled turns, and because of its low-slung construction, it can be efficiently handled under low hanging limbs of trees, as is often the case in fruit orchards where ridge controlled irrigation is extensively practiced.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an earth working implement of the character described, the combination of a transversely extending tow beam having a central and forwardly extending tongue, a rigid frame having a forward and trailing gang of earth working discs connected to one end of said tow beam, a second rigid frame having a similar forward and trailing gang of earth working discs connected to the other end of said tow beam, a lateral shaft journaled at its ends upon each of said rigid frames between their forward and trailing gangs of earth working discs, a wheeled chassis pivotally mounted upon said shaft between said rigid frames having wheels positioned radially from the axis of said shaft, a controlling lever for moving said chassis about said shaft to bring its wheels into engagement with the ground, lever means pivotally mounted at the outer end of said forwardly extending tongue and connected to said chassis controlling lever, and a draw bar slidably mounted upon said tongue adapted when moved relative to said tongue to operate said controlling lever, whereby said gangs of earth working discs will be raised to an inoperative position.

2. In an earth working implement of the character described, the combination of a transversely extending tow beam having a central and forwardly extending tongue, a rigid frame having a forward and trailing gang of earth working discs connected to one end of said tow beam, a second rigid frame having a similar forward and trailing gang of earth working discs connected to the other end of said tow beam, a laterally extending shaft journaled at its ends upon each of said rigid frames between their forward and trailing gangs of earth working discs, a wheel carrying chassis pivotally mounted upon said shaft centrally between said rigid frames, a single pair of earth engaging wheels carried by said chassis and positioned radially outward from the axis of said laterally extending shaft, means including a lever pivotally mounted at the outer end of said forwardly extending tongue for moving said chassis about said laterally extending shaft, and a draw bar slidably mounted upon said tongue adapted to operate said lever and bring the wheels upon said chassis into engagement with the earth, whereby said gangs of earth working discs will be balanced upon said laterally extending shaft and raised into an inoperative position.

3. In an earth working implement of the character described, the combination of a transversely extending tow beam, a rigid frame connected to one end of said beam having a forward and trailing gang of earth working discs, a second rigid frame connected to the other end of said tow beam having a similar forward and trailing gang of earth working discs, a shaft extending between said rigid frames at a point intermediate their forward and trailing gangs of earth working discs, and a journaled connection between said shaft and each of said frames, whereby said frames will be free to rock about said shaft and thus permit each of said gangs of earth working discs to follow the contour of the ground over which they are drawn.

4. In an earth working implement of the character described, the combination of a transversely extending tow beam, a rigid frame connected to one end of said beam having a forward and trailing gang of earth working discs, a second rigid frame connected to the other end of said tow beam having a similar forward and trailing gang of earth working discs, a spacing shaft extending between said rigid frames at a point intermediate their forward and trailing gangs of earth working discs, a journaled connection between said spacing shaft and each of said frames, whereby said frames will be free to rock about said spacing shaft and thus permit each of said gangs of earth working discs to follow the contour of the ground over which they are drawn, and means for changing the angle of said journaled connection between said frames and said spacing shaft to vary the pitch of the gangs of said earth working discs carried thereby.

5. In an earth working implement of the character described, the combination of a transversely extending tow beam, a rigid frame connected to one end of said beam having a forward and trailing gang of earth working discs, a second rigid frame connected to the other end of said tow beam having a similar forward and trailing gang of earth working discs, a shaft extending between said rigid frames at a point intermediate their forward and trailing gangs of earth working discs, a journaled connection between said shaft and each of said frames, whereby said frames will be free to rock about said shaft and thus permit each of said gangs of earth working discs to follow the contour of the ground over which they are drawn, and means for changing the lateral position of said journaled connection along said shaft to thereby vary the angular disposition of said frames with respect to said tow beam and thus change the earth gathering angle of said earth working discs.

6. In a ridge forming implement, the combination of a transversely extending tow beam adapted to be drawn by a tractor or the like, a frame having two sets of diagonally disposed earth engaging discs connected in trailing relation to one end of said tow beam, a second frame having diagonally disposed earth engaging discs connected in trailing relation to the other end of said tow beam, a spacing shaft extending transversely between said frames and journaled thereupon to permit relative contour following movements of said frames, whereby the earth engaging discs carried thereby will uniformly engage the earth when the device is in motion.

7. In a device of the character described, the combination of a transversely extending tow beam having a centrally disposed forwardly extending tongue, a frame having a plurality of earth engaging discs mounted in trailing relation and connected to one end of said tow beam, a second similar frame having a plurality of earth engaging discs mounted in trailing relation and connected to the other end of said tow beam, said frames being connected to said tow beam by a universal connection, and an adjustable spacing means connected to said frames intermediate their ends for varying the trailing angle of said frames and their earth engaging discs with respect to said tow beam.

8. In a device of the character described, the combination of a transversely extending tow beam having a centrally disposed forwardly extending tongue, a frame having a plurality of earth engaging discs mounted in trailing relation and connected to one end of said tow beam, a second similar frame having a plurality of earth engaging discs mounted in trailing relation and connected to the other end of said tow beam, said frames being connected to said tow beam by a universal connection, and a spacing shaft journaled at its ends upon each of said frames and adapted to determine the trailing angle of said frames with respect to said tow beam without interfering with a free independent up and down contour following movement of said earth engaging discs.

9. In a ridge forming implement, the combination of a rigid disc supporting frame having a leading and a trailing set of earth engaging discs disposed at an angled working position, a second rigid frame having a leading and a trailing set of earth working discs disposed at an opposite angled working position, a tow beam to which the forward ends of said frames are connected, a spacing shaft extending between said frames and upon which said frames are journaled at a point between their leading and trailing sets of earth working discs, and means adjustable along said shaft for determining the spacing and gathering angle of said earth engaging discs.

10. In a ridge forming implement, the combination of a rigid disc supporting frame having a leading and a trailing set of earth engaging discs disposed at an angled working position, a second rigid frame having a leading and a trailing set of earth working discs disposed at an opposite angled working position, a tow beam to which the forward ends of said frames are connected, a shaft supporting journal upon each of said frames located between their leading and trailing sets of earth working discs, a shaft extending through said journal and providing a transverse axis about which said frames may move relative to each other, and means for changing the angle of said journals upon said frames to thus determine the pitch and gathering angle of said earth engaging discs with respect to said transverse axis.

KENNETH D. PRIESTLEY.